July 12, 1955 R. B. TOMER 2,713,083

COLOR SWITCHING SYSTEM

Filed Dec. 22, 1951

INVENTOR
Robert B. Tomer
By George W. Crowley
Attorney

United States Patent Office 2,713,083

Patented July 12, 1955

2,713,083

COLOR SWITCHING SYSTEM

Robert B. Tomer, Danvers, Mass., assignor to Columbia Broadcasting System, Inc., a corporation of New York, doing business under the name of Hytron Radio & Electronics Co., Salem, Mass.

Application December 22, 1951, Serial No. 262,981

6 Claims. (Cl. 178—5.4)

This invention relates in general to field sequential color television systems and in particular to color switching in receivers of such systems.

In present field sequential color television receivers, color switching is usually done mechanically by placing filters of red, blue and green successively before the picture tube screen. Disks having segments of suitable filter materials are rotated in proper synchronism before the screen of a black and white picture tube in one system. This requires a disk of diameter slightly more than twice that of the picture tube screen, however. Drums having cylindrical sections of proper filter materials have also been used. It is necessary when such devices are employed to have drums of diameter exceeding the length of the picture tube and of height greater than the diameter of the picture tube screen.

Although rotating disks and drums are satisfactory color switching devices for picture tubes of relatively small size, they are not desirable for use with tubes of screen diameters exceeding twelve inches because of their sheer bulk. Also the mechanisms for driving and synchronizing the rotating drums or disks become larger and more complicated with increasing screen size.

Hence, it is an object of the present invention to provide a system for color switching in field sequential color television systems which may be used with picture tubes of any screen size.

It is a further object of the present invention to provide a mechanical color switching system which is of lighter construction than present mechanical system.

It is a still further object of the present invention to provide a mechanical color switching device which requires less driving power and is more simply synchronized with the transmitter than present systems.

In general, the present invention consists in novel apparatus for producing color images by mechanical switching action. A black-and-white image is produced in a conventional manner on a picture tube screen and a movable mask and associated color filter plate are disposed before the screen. The mask is made up of transparent and opaque areas and the color filter plate is made up of numerous filter elements each being similar in size to the transparent areas of the mask. The light forming the black-and-white image on the picture tube screen impinges upon elements of the color filter plate in a pattern and sequence determined by the movable mask. For a better understanding of the invention, together with other and further objects, features, and advantages, reference should be made to the following description which is to be read in connection with the accompanying drawings in which:

Figure 1:
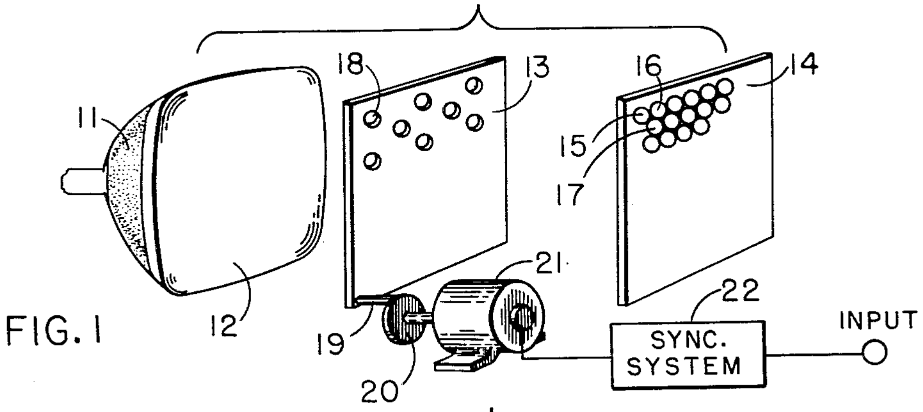
Fig. 1 is an exploded view of the color switching mechanism of the type used with dot-type additive primary colors.

Referring particularly to Fig. 1, there is shown a cathode ray tube 11 of conventional design such as is used for the picture tube of black-and-white television receivers. Screen 12 is disposed in close relationship with a mask 13 and a color filter plate 14. Color filter plate 14 is composed of many thousands of circular filter elements symmetrically disposed in similar trios, each trio containing a red, a blue, and a green element, the filter elements of each color being tangent to the filter elements of the other two colors in each trio. Similarly arranged trios of filter elements complete the filter plate. Red element 15 is tangent to blue element 16 and green element 17 of its own trio as well as tangent to elements of neighboring trios in the manner shown.

Mask 13 is made of opaque substance and has transparent (or open) circular areas formed therein. Each of these circular areas is approximately the size of the filter elements and may be similar in size to the spot created on screen 12 by the beam of cathode ray tube 11 but need not be limited to such a size. A circular area exists for each trio of filter elements, and with mask 13 in a neutral position, opening 18, which is typical, is in register with red element 15 of filter plate 14. At the same instant, each of the other circular areas of mask 13 is in register with another red element of filter plate 14. To the viewer, when screen 12 is uniformly activated and producing light, a substantially continuous field of red appears.

An eccentric drive including an off-center shaft 19, mounted in a wheel 20 which is driven by a suitable motor 21 is used to provide a rotary motion to mask 13. Shaft 19 is displaced from the center of wheel 20 a sufficient amount to cause opening 18 to move through a circular path so that it is successively in register with elements 15, 16 and 17. Simultaneously, the other openings of mask 13 move successively into register with elements of the proper colors to produce sequential fields of red, blue, and green when screen 12 is uniformly activated. The production of color images from received signals is accomplished in the same manner as in present field sequential scanning systems, synchronizing system 22 controlling the rotation of motor 21 in accordance with the signal received from the transmitter.

Figure 2:
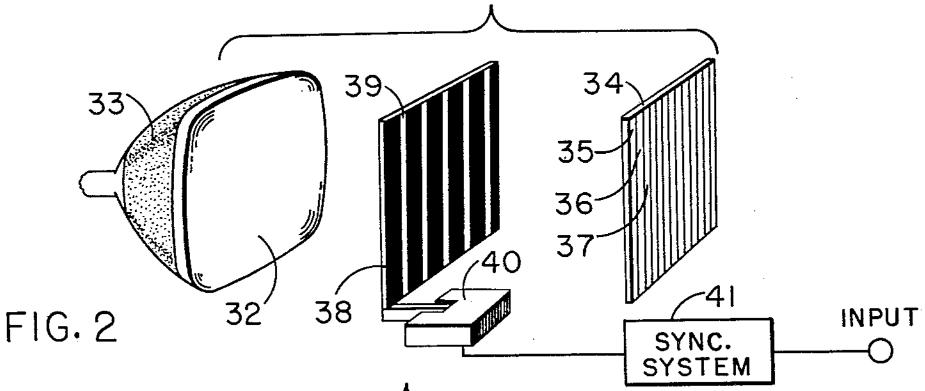
Fig. 2 is an exploded view of the color switching mechanism of the type used with line type additive primary colors.

Referring now to Fig. 2, there is shown an embodiment of the present invention which utilizes line filter elements rather than dots, but which is based upon the same general theory as outlined above. A screen 32 of a conventional black-and-white picture tube 33 produces white light when activated. A filter plate 34 is formed of alternating strips of red, blue, and green transparent materials, strips 35, 36, and 37 being representative. Disposed close to screen 32 and to filter plate 35 is a mask 38 which is composed of opaque material having transparent strips of substantially the same width as the strip elements of filter plate 34 and also approximately as wide as the diameter of the spot formed on screen 32 by the beam of cathode ray tube 33.

Transparent strip 39 is representative of the mask strips, and when mask 38 is in a neutral position, transparent strip 39 is in register with red strip 35. A vibrator mechanism 40 is connected to mask 38 and imparts a substantially saw-tooth motion thereto; that is, mask 38 is caused to move relatively slowly in a horizontal direction and to return quickly to its neutral position. The relatively slow movement of mask 38 is to the right as shown in the drawing which causes transparent strip 39 to be in register successively with red strips 35, blue strip 36, and green strip 37. The quick movement brings mask 38 to the left returning transparent strip 39 to register with red strip 35. Similar action takes place simultaneously between the other transparent strips of mask 38 and the other filter strips of filter plate 34.

A synchronizing circuit 41 is connected to vibrating mechanism 40 and causes the oscillations of mask 38 to be synchronized with the color switching at the transmitter, such that during transmission of red fields, transparent strip 39 is in register with red strip 35, during the transmission of blue fields, transparent strip 39 is in register with blue strip 36, and during the transmission of green fields, transparent strip 39 is in register with green strip 37.

Figure 3:
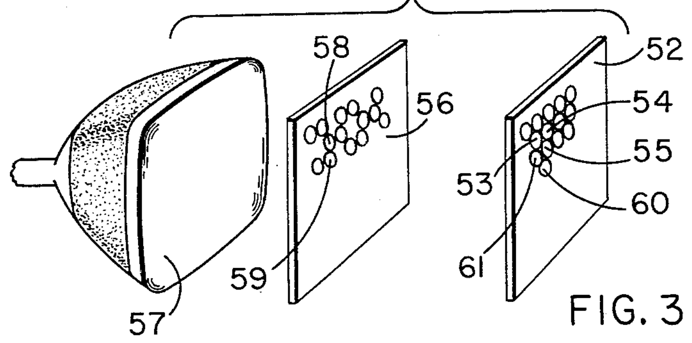
Fig. 3 is a perspective view of a color switching mechanism of the type which includes dot-type subtractive primary colors.

Referring to Fig. 3, there is shown a filter 52 and mask 53 for utilizing subtractive primary colors in place of the usual additive primary colors. In a co-pending application of Robert B. Tomer entitled, "Color Television System" Serial No. 258,566 filed November 28, 1951, a method and system for utilizing subtractive primary colors to synthesize color images were disclosed. In that application the use of phosphors of magenta and yellow to produce red, phosphors of cyan and magneta to produce blue, and phosphors of cyan and yellow to produce green and apparatus embodying those principles were disclosed. Reference is made to that application since similar theory underlies the operation of the present invention as illustrated in Fig. 3. Color filter plate 52 is constructed in the same manner as color filter plate 14 of Fig. 1 except that the filter elements comprising the trios of the filter plate are cyan as in element 53, yellow as in element 54, and magenta as in element 55.

A mask 56 similar in structure to mask 13 except that for each trio of color filter plate 52 two transparent circular areas exist, is disposed between filter plate 52 and a cathode ray tube screen 57. Circular areas 58 and 59 are typical and are in register with yellow filter elements 54 and magenta filter element 55 respectively during the neutral position which is the position assumed during reception of red field signals. Driving and synchronizing systems entirely similar to those illustrated in Fig. 1 are used here. Mask 56 is synchronously rotatable in such fashion that circular areas 58 and 59 move from register with yellow element 54 and magenta element 55 during reception of red field signals into register with cyan element 60 and magenta element 55 during reception of blue field signals and finally into register with cyan element 53 and yellow element 61 during reception of green field signals.

Integration in the eye of the viewer of the two subtractive primary colors produces the desired additive primary color in each field, as is pointed out in greater detail in the above-identified co-pending application.

Figure 4:
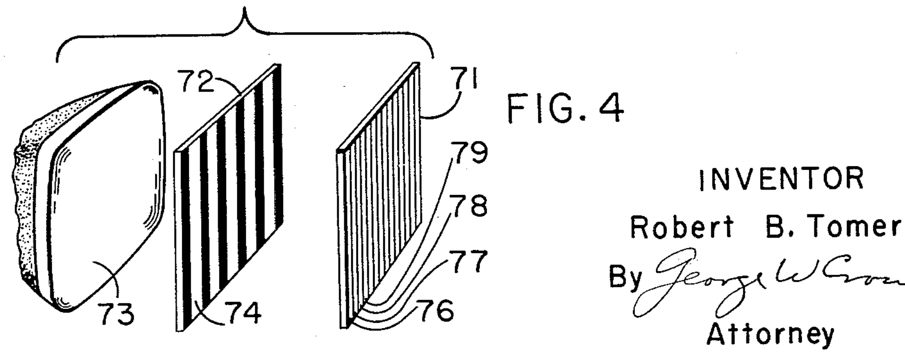
Fig. 4 is a perspective view of a color switching mechanism of the type which includes line type subtractive primary colors.

Referring now to Fig. 4, there is shown an embodiment of the present invention wherein a line type color filter plate and mask are used in conjunction with subtractive primary colors. In this case, a color filter plate 71 is formed of cyan, yellow and magenta transparent vertical strips. A mask 72 formed of vertical strips of transparent and opaque material similar to mask 38 of Fig. 2 is disposed between filter plate 71 and the screen 73 of a cathode ray tube. Mask 72 is designed such that the transparent strips in the neutral position are in register with the yellow and magenta filter strips. Transparent strip 74 is typical and is in register with typical filter elements, yellow strip 76 and magenta strip 77, in the neutral position of mask 72, cyan strip 78 being backed by the opaque portion of mask 72. Mask 72 is movable in a saw-tooth motion similar to that of the embodiment illustrated in Fig. 2 and is synchronized in that motion such that during reception of red field signals, transparent strip 74 is in register with yellow strip 76 and magenta strip 77, during reception of blue field signals, transparent strip 74 is in register with cyan strip 78 and magenta 77, and during reception of green field signals, transparent strip 74 is in register with cyan strip 78 and yellow strip 79. After reception of the green field mask 72 returns quickly to the neutral position with transparent strip 74 in register with yellow strip 76 and magenta strip 77.

Again, as in the case of the embodiment of Fig. 3, integration of the subtractive primary colors in the eye of the viewer produces the desired additive primary color during the reception of each field.

In the embodiments of both Fig. 3 and Fig. 4, the light output for a given field is substantially doubled over that of the embodiments of Figs. 1 and 2 due to the larger number of openings in the masks permitting more light to reach the color filter plates.

While what has been disclosed constitute preferred embodiments of the present invention, the invention should not be limited to the details shown. Such details are primarily to facilitate understanding of the invention which is of breadth commensurate with the spirit and scope of the appended claims.

What is claimed is:

1. Color switching apparatus for a field sequential television system comprising, a cathode ray tube having a screen for presenting received images in black-and-white, a color filter plate including a plurality of filter elements, said filter elements being arranged in groups of three, each group containing a first, a second, and a third subtractive primary color filter element, a generally opaque mask disposed between said filter plate and said screen, said mask having transparent areas formed therein of size comparable to that of two of said filter elements, and means for moving said mask to permit light from said screen to pass sequentially through elements of said first and second subtractive primary colors, through elements of said second and third subtractive primary colors and through elements of said third and first subtractive primary colors.

2. Apparatus as in claim 1 including a circuit for synchronizing the movement of said mask in accordance with received color switching signals.

3. Color switching apparatus for a field sequential television system comprising, a cathode ray tube having a screen for presenting received images in black-and-white, a color filter plate including a plurality of filter elements, said filter elements being arranged in groups of three, each group containing a yellow, a magenta and a cyan element, a generally opaque movable mask disposed between said filter plate and said screen, said mask having a plurality of paired transparent areas formed therein, each pair of transparent areas being in register with a yellow and a magenta filter element in the neutral position of said mask, and means for rotating said mask such that said paired transparent areas are successively in register with said yellow and magenta filter elements, said magenta and cyan elements, and said cyan and yellow elements, whereby successive fields of red, blue and green appear to a viewer of said screen.

4. Apparatus as in claim 3 including means for synchronizing the movement of said mask in accordance with received color switching signals.

5. Color switching apparatus for a field sequential television system comprising, a cathode ray tube having a screen for presenting received images in black-and-white, a color filter plate including a plurality of vertically arranged filter element strips, said strips being a contiguous repetitive series of yellow, magenta and cyan filters, a generally opaque movable mask having spaced transparent vertical strips of substantially twice the width of each of said filter element strips, said transparent strips being in register with said magenta and yellow strips in the neutral position of said mask, an oscillating drive mechanism for moving said mask horizontally in a first direction from said neutral position at a relatively slow rate and returning said mask to said neutral position at a relatively fast rate, means for synchronizing said oscillating mechanism such that said transparent strip is in register with said magenta and yellow strips during reception of red field signals, in register with said magenta and cyan strips during reception of blue field signals, and in register with said cyan and yellow strips during reception of green field signals.

6. Color switching apparatus for a field sequential television system comprising, a cathode ray tube having a screen for presenting received images in black-and-white, a color filter plate including a plurality of circular filter elements in tangential relationship one to another, said filter elements being symmetrically arranged in similar trios, the first of said elements in each of said trios being a cyan filter, the second of said elements in each of said trios being a magenta filter and the third of said elements in each of said trios being a yellow filter, a generally opaque mask disposed between said filter plate and said screen, said mask being movable in a given plane parallel to said screen and said filter plate and having transparent circular apertures formed therein, said apertures being arranged in pairs such that each pair of said apertures is in register with said magenta element and said yellow element of each of said trios of said filter plate in the neutral position of said mask, an eccentric drive mechanism for rotating said mask in said given plane such that said apertures are successively in register with, first, the magenta and yellow elements of a first trio, second, the magenta element of the first trio and the cyan element of a second trio, and third, the cyan element of said first trio and the yellow element of a third trio, successive fields of red, blue and green appearing to viewers during the presence of white light on said screen.

References Cited in the file of this patent

UNITED STATES PATENTS

| | | |
|---|---|---|
| 2,389,979 | Huffnagle | Nov. 27, 1945 |
| 2,452,293 | De Forest | Oct. 26, 1948 |
| 2,457,415 | Sziklai | Dec. 28, 1948 |
| 2,479,517 | Schensted | Aug. 16, 1949 |
| 2,528,510 | Goldmark | Nov. 7, 1950 |
| 2,530,107 | Webb | Nov. 14, 1950 |
| 2,617,875 | De Forest | Nov. 11, 1952 |

FOREIGN PATENTS

| | | |
|---|---|---|
| 589,345 | Great Britain | Oct. 22, 1945 |
| 620,137 | Great Britain | Mar. 21, 1949 |